US009959678B2

(12) United States Patent
Katz et al.

(10) Patent No.: US 9,959,678 B2
(45) Date of Patent: May 1, 2018

(54) FACE AND EYE TRACKING USING FACIAL SENSORS WITHIN A HEAD-MOUNTED DISPLAY

(71) Applicant: Oculus VR, LLC, Menlo Park, CA (US)

(72) Inventors: Dov Katz, Irvine, CA (US); Michael John Toksvig, Palo Alto, CA (US); Ziheng Wang, Mountain View, CA (US); Timothy Paul Omernick, Foster City, CA (US); Torin Ross Herndon, Palo Alto, CA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days. days.

(21) Appl. No.: 15/172,473

(22) Filed: Jun. 3, 2016

(65) Prior Publication Data
US 2017/0352183 A1    Dec. 7, 2017

(51) Int. Cl.
*G09G 5/00* (2006.01)
*G02B 27/01* (2006.01)
(Continued)

(52) U.S. Cl.
CPC ........ *G06T 19/006* (2013.01); *G02B 27/0172* (2013.01); *G06K 9/00255* (2013.01);
(Continued)

(58) Field of Classification Search
CPC .......... G06F 3/012; G06F 3/013; G06F 3/015; G06F 3/017; G06F 3/0481; G06F 3/0304;
(Continued)

(56) References Cited

U.S. PATENT DOCUMENTS

| 7,418,116 B2 | 8/2008 | Fedorovskaya et al. |
| 8,941,665 B1 * | 1/2015 | Sullivan .................. G06T 13/40 345/418 |

(Continued)

FOREIGN PATENT DOCUMENTS

WO    WO 2013/173531 A1    11/2013

OTHER PUBLICATIONS

PCT International Search Report and Written Opinion, PCT Application No. PCT/US2016/046375, dated Feb. 28, 2017, 16 pages.
(Continued)

*Primary Examiner* — Jin-Cheng Wang
(74) *Attorney, Agent, or Firm* — Fenwick & West LLP

(57) ABSTRACT

A head mounted display (HMD) in a VR system includes sensors for tracking the eyes and face of a user wearing the HMD. The VR system records calibration attributes such as landmarks of the face of the user. Light sources illuminate portions of the user's face covered by the HMD. In conjunction, facial sensors capture facial data. The VR system analyzes the facial data to determine the orientation of planar sections of the illuminated portions of face. The VR system aggregates planar sections of the face and maps the planar sections to landmarks of the face to generate a facial animation of the user, which can also include eye orientation information. The facial animation is represented as a virtual avatar and presented to the user.

20 Claims, 6 Drawing Sheets

(51) Int. Cl.
  *G06T 13/40* (2011.01)
  *G06T 19/00* (2011.01)
  *G06K 9/00* (2006.01)
  *H04N 5/225* (2006.01)
  *H04N 17/00* (2006.01)

(52) U.S. Cl.
  CPC .......... *G06K 9/00302* (2013.01); *G06T 13/40* (2013.01); *H04N 5/2256* (2013.01); *H04N 17/002* (2013.01); *G02B 2027/0141* (2013.01); *G02B 2027/0187* (2013.01)

(58) Field of Classification Search
  CPC ............... G06F 3/0484; G02B 25/001; G02B 2027/014; G02B 2027/0187; G02B 27/017; G02B 2027/0138; G02B 2027/0141; G02B 2027/0143; G02B 2027/0178; G02B 27/0093; G02B 27/0172; G06K 9/00221; G06K 9/00268; G06K 9/00604; G06T 5/005; G06T 17/00; G06T 11/60; G06T 7/20; G06T 19/006; G06T 2207/10152; G06T 2207/30201; G06T 13/40; G09G 2354/00
  USPC ...................... 345/633, 8, 473, 474; 382/103
  See application file for complete search history.

(56) References Cited

U.S. PATENT DOCUMENTS

| | | | |
|---|---|---|---|
| 9,255,813 B2* | 2/2016 | Liu | G06F 3/011 |
| 2003/0138134 A1 | 7/2003 | Petrich | |
| 2004/0179013 A1* | 9/2004 | Menache | G06T 11/00 |
| | | | 345/473 |
| 2010/0290126 A1 | 11/2010 | Domjan et al. | |
| 2013/0114043 A1 | 5/2013 | Balan et al. | |
| 2013/0169683 A1 | 7/2013 | Perez et al. | |
| 2014/0118357 A1 | 5/2014 | Covington | |
| 2014/0177023 A1* | 6/2014 | Gao | H04N 5/2258 |
| | | | 359/238 |
| 2014/0361977 A1* | 12/2014 | Stafford | G02B 27/0093 |
| | | | 345/156 |
| 2014/0362091 A1* | 12/2014 | Bouaziz | G06T 13/40 |
| | | | 345/473 |
| 2015/0035744 A1* | 2/2015 | Robbins | G02B 27/017 |
| | | | 345/156 |
| 2015/0084950 A1* | 3/2015 | Li | G06K 9/00214 |
| | | | 345/419 |
| 2015/0098620 A1* | 4/2015 | Wu | G01S 17/06 |
| | | | 382/103 |
| 2015/0193098 A1* | 7/2015 | Kauffmann | G06F 3/0484 |
| | | | 715/771 |
| 2015/0310262 A1* | 10/2015 | Do | G06K 9/00308 |
| | | | 382/195 |
| 2016/0026253 A1 | 1/2016 | Bradski et al. | |
| 2016/0054791 A1 | 2/2016 | Mullins et al. | |
| 2016/0210497 A1* | 7/2016 | Rougeaux | G06K 9/0061 |
| 2016/0246384 A1* | 8/2016 | Mullins | G06F 3/017 |
| 2016/0341959 A1* | 11/2016 | Gibbs | G02B 27/0093 |
| 2016/0343164 A1 | 11/2016 | Urbach et al. | |

OTHER PUBLICATIONS

European Extended Search Report, European Application No. 16200100.2, dated May 23, 2017, 13 pages.
Jones, A. et al., "Head-Mounted Photometric Stereo for Performance Capture," 2011 IEEE Conference for Visual Media Production (CVMP), Nov. 16, 2011, pp. 158-164.
Romera-Paredes, B. et al., "Facial Expression Tracking from Head-Mounted, Partially Observing Cameras," 2014 IEEE International Conference on Multimedia and Expo (ICME), Jul. 14, 2014, pp. 1-6.
Burgos-Artizzu, X.P. et al., "Real-Time Expression-Sensitive HMD Face Reconstruction," SIGGRAPH Asia 2015 Technical Briefs (SA '15), ACM, Article 9, 2015, 4 pages.
Georghiades, A.S. et al., "From Few to Many: Illumination Cone Models for Face Recognition Under Variable Lighting and Pose," IEEE Transactions on Pattern Analysis and Machine Intelligence, Jun. 2001, pp. 643-660, vol. 23, No. 6.
Huang, X. et al., "Towards a Dynamic Expression Recognition System Under Facial Occlusion," Pattern Recognition Letters, 2012, pp. 2181-2191, vol. 33, No. 16.
Sim, T. et al., "The CMU Pose, Illumination, and Expression (PIE) Database of Human Faces," IEEE Transactions on Pattern Analysis and Machine Intelligence, 2003, 18 pages, vol. 25, No. 12.

* cited by examiner

FACE AND EYE TRACKING USING FACIAL SENSORS WITHIN A HEAD-MOUNTED DISPLAY

BACKGROUND

The present disclosure generally relates to head-mounted displays (HMDs), and specifically relates to eye and facial tracking within a HMD.

Virtual reality (VR) systems typically include a display screen that presents virtual reality images, which may depict elements such as objects and users of the systems. Users can be represented by an avatar in the virtual environment. In some VR systems, avatars are depicted with only one facial expression, e.g., a default smiling or neutral facial expression, which prevents the user from having a fully immersive experience in a virtual environment. Facial tracking systems provide a more immersive interface. Existing systems that track facial expressions of users include a dedicated peripheral such as a camera, in addition to markers that must be positioned on the face of a user being tracked. These traditional peripherals and markers artificially separate the user from the virtual environment. Thus, existing facial tracking systems are unsuitable for use in a portable, lightweight, and high-performance virtual reality headset.

SUMMARY

A head mounted display (HMD) in a VR system, includes sensors for tracking the eyes and face of a user wearing the HMD. The VR system records calibration attributes such as landmarks of the face of the user. For instance, a landmark describes the location of the user's nose relative to the user's face. The calibration attributes can also be retrieved from an online database of global calibration attributes. The HMD includes facial sensors positioned inside the HMD, and in some embodiments, the HMD also includes light sources that are also positioned inside the HMD. The light sources illuminate portions of the user's face covered by the HMD. In conjunction, the facial sensors capture facial data describing the illuminated portions of the face. The facial data can be images referred to as facial data frames. In this case, the VR system analyzes the facial data frames to determine the orientation of planar sections (i.e., small portions of the user's face that are approximated with a plane) of the illuminated portions of face. In particular, the VR system uses pixel brightness information to determine the orientation of surfaces. The pixel brightness depends on the position and/or orientation of the light sources because reflected light is brightest when the angle of incidence equals the angle of reflectance. The VR system aggregates the planar sections of the face and maps the planar sections to landmarks of the face to generate facial animation information describing the face of the user.

The facial animation information may be used to update portions of a face of a virtual avatar of the user. For example, the user views the virtual avatar when using the HMD, and thus experiences an immersive VR experience. The VR system can also track the eyes of the user wearing the HMD. Accordingly, the facial animation information can be used to update eye orientation of the virtual avatar of the user.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
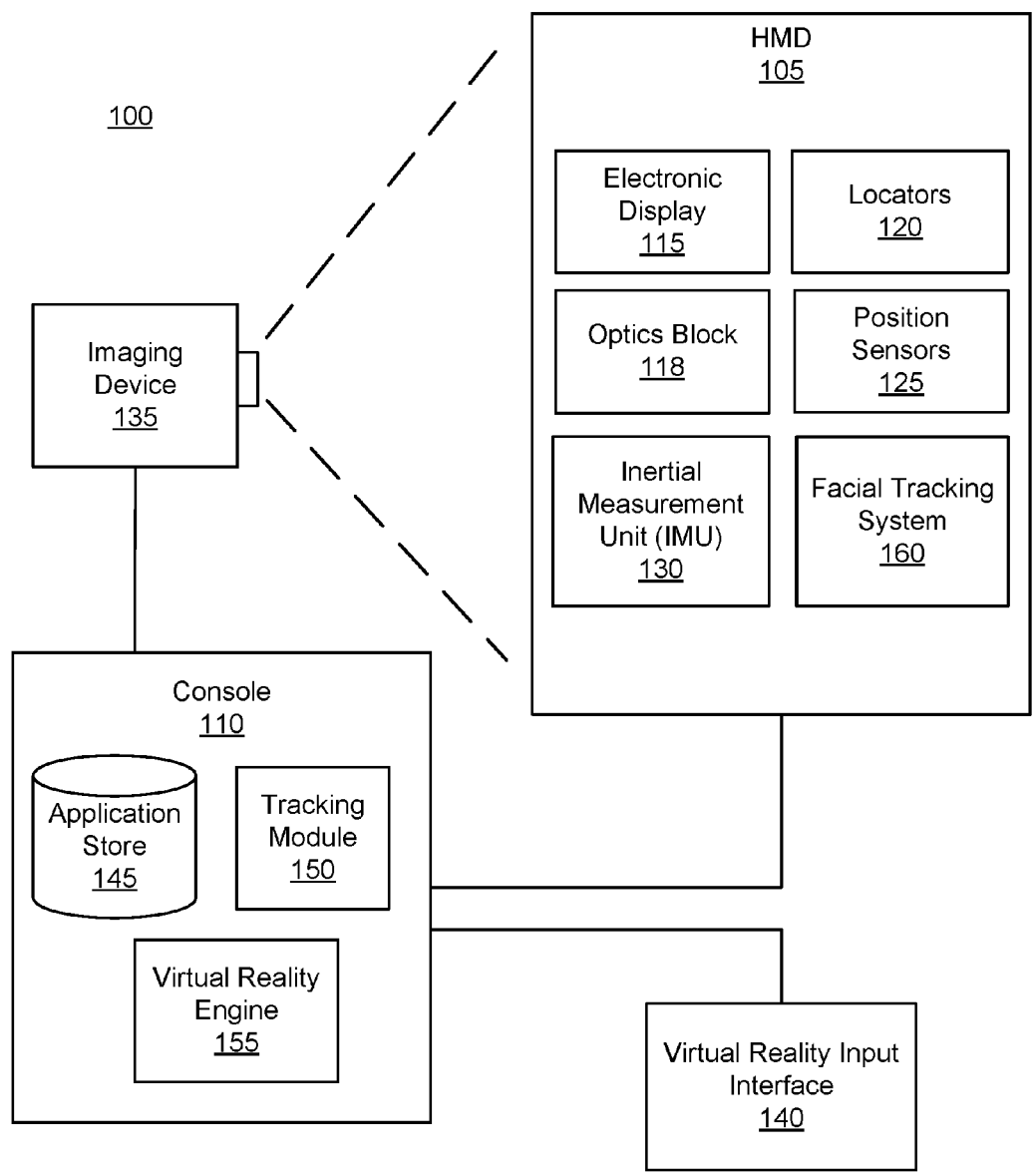
FIG. 1 is a block diagram of a VR system in accordance with an embodiment.

FIG. 1 is a block diagram of a VR system 100 in accordance with an embodiment. In some embodiments, the VR system 100 operates in augmented reality (AR) and/or mixed reality (MR) environments. The system 100 shown in FIG. 1 comprises a head mounted display (HMD) 105, an imaging device 135, and a VR input interface 140 that are each coupled to a console 110. While FIG. 1 shows an example system 100 including one HMD 105, one imaging device 135, and one VR input interface 140, in other embodiments, any number of these components are included in the system 100. For example, there are multiple HMDs 105 each having an associated VR input interface 140 and being monitored by one or more imaging devices 135, with each HMD 105, VR input interface 140, and imaging device 135 communicating with the console 110. In alternative configurations, different and/or additional components may be included in the system 100.

The HMD 105 presents content to a user. Examples of content presented by the HMD 105 include one or more images, video, audio, or some combination thereof. In some embodiments, audio is presented via an external device (e.g., speakers and/or headphones) that receives audio information from the HMD 105, the console 110, or both, and presents audio data based on the audio information. An embodiment of the HMD 105 is further described below in conjunction with FIG. 3 through FIG. 5. In one example, the HMD 105 comprises one or more rigid bodies, which are rigidly or non-rigidly coupled to each other. A rigid coupling between rigid bodies causes the coupled rigid bodies to act as a single rigid entity. In contrast, a non-rigid coupling between rigid bodies allows the rigid bodies to move relative to each other.

The HMD 105 includes an electronic display 115, an optics block 118, one or more locators 120, one or more position sensors 125, an inertial measurement unit (IMU) 130, and a facial tracking system 160. The electronic display 115 displays images to the user in accordance with data received from the console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The optics block 118 magnifies received image light from the electronic display 115, corrects optical errors associated with the image light, and presents the corrected image light to a user of the HMD 105. In an embodiment, the optics block 118 includes one or more optical elements and/or combinations of different optical elements. For example, an optical element is an aperture, a Fresnel lens, a convex lens, a concave lens, a filter, or any other suitable optical element that affects the image light emitted from the electronic display 115. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the displayed content. For example, the field of view of the displayed content is such that the displayed content is presented using almost all (e.g., 110 degrees diagonal), and in some cases all, of the user's field of view. In some embodiments, the optics block 118 is designed so its effective focal length is larger than the spacing to the electronic display 115, which magnifies the image light projected by the electronic display 115. Additionally, in some embodiments, the amount of magnification is adjusted by adding or removing optical elements.

In an embodiment, the optics block 118 is designed to correct one or more types of optical errors in addition to fixed pattern noise (i.e., the screen door effect). Examples of optical errors include: two-dimensional optical errors, three-dimensional optical errors, or some combination thereof. Two-dimensional errors are optical aberrations that occur in two dimensions. Example types of two-dimensional errors include: barrel distortion, pincushion distortion, longitudinal chromatic aberration, transverse chromatic aberration, or any other type of two-dimensional optical error. Three-dimensional errors are optical errors that occur in three dimensions. Example types of three-dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The locators 120 are objects located in specific positions on the HMD 105 relative to one another and relative to a specific reference point on the HMD 105. A locator 120 may be a light emitting diode (LED), a corner cube reflector, a reflective marker, a type of light source that contrasts with an environment in which the HMD 105 operates, or some combination thereof. In embodiments where the locators 120 are active (e.g., an LED or other type of light emitting device), the locators 120 may emit light in the visible band (i.e., ~380 nm to 750 nm), in the infrared (IR) band (i.e., ~750 nm to 1 mm), in the ultraviolet band (i.e., 10 nm to 380 nm), some other portion of the electromagnetic spectrum, or some combination thereof.

In some embodiments, the locators 120 are located beneath an outer surface of the HMD 105, which is transparent to wavelengths of light emitted or reflected by the locators 120 or is thin enough not to substantially attenuate the wavelengths of light emitted or reflected by the locators 120. Additionally, in some embodiments, the outer surface or other portions of the HMD 105 are opaque in the visible band of wavelengths of light. Thus, the locators 120 may emit light in the IR band under an outer surface that is transparent in the IR band but opaque in the visible band.

The IMU 130 is an electronic device that generates fast calibration attributes based on measurement signals received from one or more of the position sensors 125. A position sensor 125 generates one or more measurement signals in response to motion of the HMD 105. Examples of position sensors 125 include: one or more accelerometers, one or more gyroscopes, one or more magnetometers, another suitable type of sensor that detects motion, a type of sensor used for error correction of the IMU 130, and/or some combination thereof. The position sensors 125 may be located external to the IMU 130, internal to the IMU 130, and/or some combination thereof.

Based on the one or more measurement signals from one or more position sensors 125, the IMU 130 generates fast calibration attributes indicating an estimated position of the HMD 105 relative to an initial position of the HMD 105. For example, the position sensors 125 include multiple accelerometers to measure translational motion (forward/back, up/down, and left/right) and multiple gyroscopes to measure rotational motion (e.g., pitch, yaw, and roll). In some embodiments, the IMU 130 rapidly samples the measurement signals and calculates the estimated position of the HMD 105 from the sampled data. For example, the IMU 130 integrates the measurement signals received from the accelerometers over time to estimate a velocity vector and integrates the velocity vector over time to determine an estimated position of a reference point on the HMD 105. Alternatively, the IMU 130 provides the sampled measurement signals to the console 110, which determines the fast calibration attributes. In one embodiment, the reference point is a point that is used to describe the position of the HMD 105. While the reference point may generally be defined as a point in space, however, in practice the reference point is defined as a point within the HMD 105 (e.g., a center of the IMU 130).

The IMU 130 receives one or more calibration parameters from the console 110. As further discussed below, the one or more calibration parameters are used to maintain tracking of the HMD 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The facial tracking system 160 tracks portions of a face of a user (e.g., including eyes of the user). The portions of the face are, for example, portions of the face covered by the HMD 105 worn by the user. In some embodiments the facial tracking system 160 collects calibration attributes. The calibration attributes describes landmarks (e.g., a location of an eyebrow or nose of the user) of the face covered by the HMD 105. In some embodiments, the facial tracking system 160 uses the tracked portions of the face (may also include eye position) and the calibration attributes to generate facial animation information describing the tracked portions of the user's face. The facial tracking system 160 generates tracking information based on, e.g., tracked portions of a face of the user (may include eye position), calibration attributes, facial animation information, or some combination thereof.

Tracking information is information passed to the console 110 that may be used for virtual animation of a portion of a user's face. The facial tracking system 160 passes the tracking information to the console 110. In some embodiments, the tracking information does not include facial animation information which is generated by the console 110.

Figure 2:
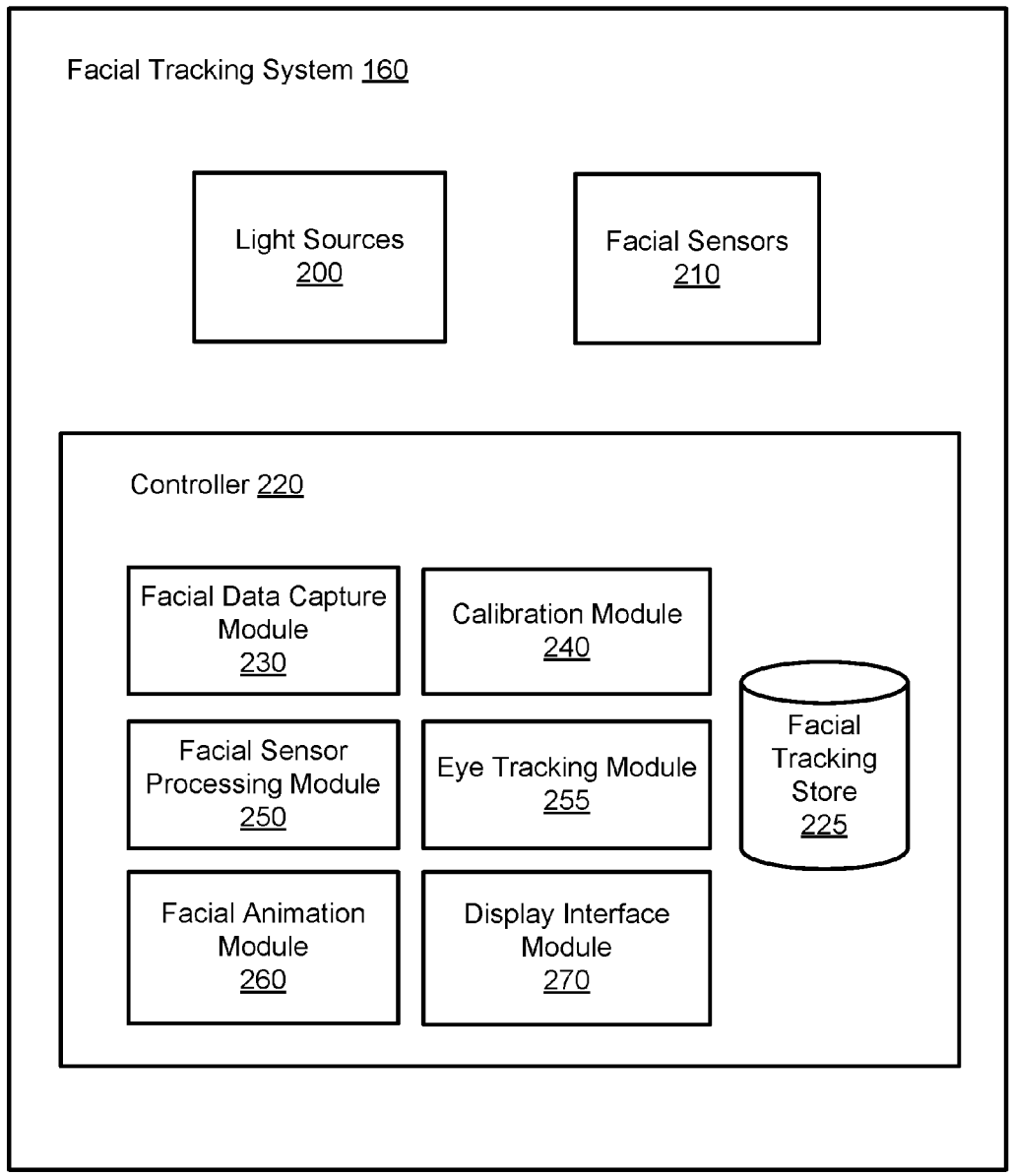
FIG. 2 is a block diagram of a facial tracking system of a VR system in accordance with an embodiment.

In some embodiments, the facial tracking system 160 includes one or more light sources, one or more facial sensors, and a controller, which is further described in FIG. 2. In some embodiments, the facial tracking system 160 tracks eye movements of the user, e.g., corneal sphere tracking to track one or both eyes of a user while the user is wearing the HMD 105. In some embodiments, the light sources and the facial sensors are communicatively coupled to a controller that performs data processing for generating the facial animation, performing optical actions, and the like.

The imaging device 135 generates slow calibration attributes in accordance with calibration parameters received from the console 110. Slow calibration attributes includes one or more images showing observed positions of the locators 120 that are detectable by the imaging device 135. In some embodiments, the imaging device 135 includes one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration attributes is communicated from the imaging device 135 to the console 110, and the imaging device 135 receives one or more calibration parameters from the console 110 to adjust one or more imaging parameters (e.g., focal length, focus, frame rate, ISO, sensor temperature, shutter speed, aperture, etc.).

The VR input interface 140 is a device that allows a user to send action requests to the console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the console 110. An action request received by the VR input interface 140 is communicated to the console 110, which performs an action corresponding to the action request. In some embodiments, the VR input interface 140 may provide haptic feedback to the user in accordance with instructions received from the console 110. For example, haptic feedback is provided when an action request is received, or the console 110 communicates instructions to the VR input interface 140 causing the VR input interface 140 to generate haptic feedback when the console 110 performs an action.

The console 110 provides content to the HMD 105 for presentation to a user in accordance with information received from one or more of: the imaging device 135, the HMD 105, and the VR input interface 140. In the example shown in FIG. 1, the console 110 includes an application store 145, a tracking module 150, and a VR engine 155. Some embodiments of the console 110 have different modules than those described in conjunction with FIG. 1. Similarly, the functions further described below may be distributed among components of the console 110 in a different manner than is described here.

The application store 145 stores one or more applications for execution by the console 110. An application is a group of instructions, that when executed by a processor, generates content for presentation to the user. Content generated by an application may be in response to inputs received from the user via movement of the HMD 105 or the VR interface device 140. Examples of applications include: gaming applications, conferencing applications, video playback application, or other suitable applications.

The tracking module 150 calibrates the system 100 using one or more calibration parameters and may adjust one or more calibration parameters to reduce error in determination of the position of the HMD 105. For example, the tracking module 150 adjusts the focus of the imaging device 135 to obtain a more accurate position for observed locators on the HMD 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 140 re-calibrates some or the entire system 100.

The tracking module 150 tracks movements of the HMD 105 using slow calibration information from the imaging device 135. The tracking module 150 determines positions of a reference point of the HMD 105 using observed locators from the slow calibration information and a model of the HMD 105. The tracking module 150 also determines positions of a reference point of the HMD 105 using position information from the fast calibration information. Additionally, in some embodiments, the tracking module 150 uses portions of the fast calibration information, the slow calibration information, or some combination thereof, to predict a future location of the HMD 105. The tracking module 150 provides the estimated or predicted future position of the HMD 105 to the VR engine 155.

The VR engine 155 executes applications within the system 100 and receives position information, acceleration information, velocity information, predicted future positions, or some combination thereof of the HMD 105 from the tracking module 150. Based on the received information, the VR engine 155 determines content to provide to the HMD 105 for presentation to a user. In some embodiments, the VR engine 155 generates facial animation information based on tracking information received from the HMD 105. In alternate embodiments, the VR engine 155 receives facial animation information directly from the HMD 105 as part of the tracking information. For example, the VR engine 155 receives facial animation information from the facial animation module 260 of the facial tracking system 160 (further described in FIG. 2). Based on the facial animation information, the VR engine 155 generates a facial expression of an avatar and/or a virtual face of an avatar, including eye movements of the avatar, corresponding to a user of a HMD 105. For instance, a facial expression or eye movement of the avatar corresponds to a facial expression or eye movement that the user performs in real life. The VR engine 155 provides the virtual face for presentation to the user via the electronic display 115 of the HMD 105. In another example, if the received information indicates that the user has looked to the left, the VR engine 155 generates content for the HMD 105 that mirrors the user's movement in a virtual environment. Additionally, the VR engine 155 performs an action within an application executing on the console 110 in response to an action request received from the VR input interface 140 and provides feedback to the user that the action was performed. For example, the provided feedback includes visual or audible feedback via the HMD 105 or haptic feedback via the VR input interface 140.

Facial Tracking System

FIG. 2 is a block diagram of the facial tracking system 160 of the VR system 100 in accordance with an embodiment. In the example shown in FIG. 2, the facial tracking system 160 includes one or more light sources 200, one or more facial sensors 210, and a controller 220. In other embodiments, different and/or additional components may be included in the facial tracking system 160, or the facial tracking system 160 may be part of a system that is different from the VR system 100.

The one or more light sources 200 illuminate portions of a face of the user covered by the HMD 105 wearing the HMD 105, and are positioned at discrete locations on the HMD 105. In an embodiment, the light sources 200 are positioned in a ring arrangement. In particular, each light source 200 of the plurality of light sources is positioned on a circumference of a circle, e.g., a virtual circle overlaying an eyecup assembly of the HMD 105 (further described in FIG. 4). For instance, each light source 200 is positioned at an hour hand position of a typical analog clock. In one embodiment, the one or more light sources 200 are light-emitting diodes (LEDs) that emit light in the visible band (i.e., ~380 nm to 750 nm), in the infrared (IR) band (i.e., ~750 nm to 1 mm), in the ultraviolet band (i.e., 10 nm to 380 nm), some other portion of the electromagnetic spectrum, or some combination thereof. In some embodiments, the light sources 200 comprise different optical characteristics for either all of the light sources 200 or between a subset of the light sources 200. An optical characteristic is a feature of the light sources 200. For example, an optical characteristic may be a wavelength of light emitted by the light sources 200, a temporal coherence that describes the correlation between light waves of the light sources 200 at different points in time, or some combination thereof. Further, the light from the light sources 200 can be modulated at different frequencies or amplitudes (i.e., varying intensity) and/or multiplexed in either time or frequency domain.

The one or more facial sensors 210 capture facial data of a user of the HMD 105. Facial data describes features of a face of the user, e.g., features of portions of the face covered by the HMD 105. The facial sensors 210 may be imaging type sensors and/or non-imaging type sensors. Imaging type facial sensors 210 are, e.g., cameras that capture images of the portions of the face of the user. The images comprise a plurality of pixels, and the pixels each have a level of brightness. Non-imaging type facial sensors 210 are, e.g., audio sensors, strain gauges, electromagnetic sensors, proximity sensor, or some other non-optical type sensor. The facial sensors 210 may have plurality of parameters such as focal length, focus, frame rate, ISO, sensor temperature, shutter speed, aperture, resolution, etc. In some embodiments, the facial sensors 210 have a high frame rate and high resolution.

In an embodiment, imaging type facial sensors 210 are positioned such that reflections in response to light from the light sources 200 incident upon a user (e.g., incident upon portions of a face of the user covered by the HMD 105) can be captured over a range of user movements. In one example, the facial sensors 210 are positioned off-axis such that they are outside of a line of sight of the user wearing the HMD 105, i.e., if the user looks at the display element 115 of the HMD 105, the facial sensors 210 are not located within the user's direct line of sight. In other embodiments, the facial sensors 210 are positioned within the line of sight of the user wearing the HMD 105, i.e., the user can see the facial sensors 210 while looking at the display element 115.

In an embodiment where the facial sensors 210 are non-imaging sensors, the facial tracking system 160 does not necessarily need the light sources 200. For instance, the facial sensors 210 are proximity sensors based on ultrasound. Thus, the facial sensors 210 capture facial data indicating a distance between a facial sensor 210 and portions of a face of a user. The facial sensor 210 determines the distance based on a time that an ultrasound wave takes to reflect off the portions of the face and travel back to the facial sensor 210. In this case, the facial sensor 210 emits ultrasound waves toward the face of the user, and the reflected ultrasound waves are detected by the facial sensor 210.

The controller 220 controls the facial tracking system 160. The controller 220 includes a facial tracking store 225, a facial data capture module 230, a calibration module 240, a facial sensor processing module 250, an eye tracking module 255, a facial animation module 260, and a display interface module 270. In other embodiments, different and/or additional components may be included in the controller 220. In the example shown in FIG. 2, the controller 220 is part of the facial tracking system 160, and thus also part of the HMD 105. In other embodiments, some or all of the controller 220 is outside of the HMD 105, e.g., the controller 220 is included as part of the console 110 or included in another component and/or system outside of the system 100. Having the controller 220 outside of the HMD 105 may be an advantage in some embodiments because the HMD 105 can reduce the required amount of processing power to execute functions of the controller; in embodiments where the HMD 105 is powered with a rechargeable battery, reducing the processing power increases the battery life of the HMD 105.

The facial tracking store 225 stores data recorded by, or used by, the facial tracking system 160. Stored data may include, e.g., tracking information, facial data, eye tracking information, calibration attributes, facial animation information, some other information used for facial tracking, or some combination thereof. Facial data includes information about tracked surfaces of a face of a user wearing the HMD 105. Calibration attributes includes information about landmarks of the user's face. Facial data and calibration attributes are further described below. The facial tracking store 225 may store information retrieved from a source outside of the facial tracking system 160, e.g., from the console 110 or from an online source. Other modules of the facial tracking system 160 store information to the facial tracking store 225 and/or retrieve information from the facial tracking store 225.

The facial data capture module 230 receives facial data from the facial sensors 210. In an embodiment including imaging type facial sensors 210 (e.g., cameras), the facial data capture module 230 provides instructions to one or more light sources 200 to illuminate portions of a face of the user. In conjunction, the facial data capture module 230 also provides instructions to one or more facial sensors 210 to capture one or more facial data frames of the illuminated portions of the face (e.g., portions inside the HMD 105). In an embodiment, the facial data capture module 230 stores the captured facial data frames in the facial tracking store 225 and/or any other database on or off of the system 100 that the facial tracking system 160 can access.

In an embodiment including non-imaging type facial sensors 210, the facial data capture module 230 provides instructions to the facial sensors 210 to capture facial data of a portion of a face of a user wearing a HMD 105. In this embodiment, facial tracking system 160 may not include the light sources 200. Thus, in some embodiments, the facial data capture module 230 does not provide instructions to the light sources 200 in conjunction with the instructions to the facial sensors 210.

The facial data capture module 230 coordinates control of each light source 200. In some embodiments, e.g., an embodiment with light sources 200 positioned in a ring arrangement, the facial data capture module 230 provides instructions to the light sources 200 such that only one light source emits light at any given time (e.g., per eye or per HMD 105). The light sources in the ring emit light, i.e., illuminate portions of a face of the user, in sequential order, e.g., starting at one light source of the ring and emitting in a clockwise or counterclockwise direction around the eye of the user. Alternatively, the light sources emit light in any other order or type of sequence. For example, twelve light sources 200 are positioned in a ring arrangement, each light source corresponding to an hour hand position (i.e., 1 to 12) of a typical analog clock, around an eye of the user. The light sources corresponding to the even numbers sequentially emit light first, and then the light sources corresponding to the odd numbers sequentially emit light next. Specifically, the order of light sources emitting is: 2, 4, 6, 8, 10, 12, 1, 3, 5, 7, 9, and 11. In some embodiments, the order light sources emitting is random and/or changes over time. The facial data capture module 230 can repeat the same sequence (or different sequences) of illumination over a certain period of time at various rates of illumination. For example, the facial data capture module 230 repeats a clockwise illumination sequence at a rate of 60 illuminations per second for a period of ten seconds. In addition to the ring arrangement, the light sources 200 may be positioned in any other arrangement pattern or arbitrary in the HMD 105.

Following in the same embodiment including the plurality of light sources 200 positioned in the ring around each eye of the user, the facial data capture module 230 provides instructions to the facial sensors 210 to capture facial data corresponding to each illumination, e.g., each instance of a light source of the plurality illuminating a portion of the user corresponds to a frame of facial data. Thus, the facial data capture module 230 must synchronize the illuminations and the frame captures. For example, if the light sources 200 are emitting light at a rate of 24 illuminations per second, then the facial sensors 210 capture frames at a rate of at least 24 frames per second to achieve a desired facial data resolution.

The calibration module 240 calibrates the HMD 105 to a user. The calibration module 240 retrieves calibration attributes from the facial tracking store 225, an online calibration server, or some combination thereof, using one or more selection parameters. A selection parameter is a characteristic of a user that is mapped to calibration attributes. A selection parameter may be, e.g., age, race, gender, citizenship, spoken language, some other characteristic that can affect facial expressions, or some combination thereof.

The calibration module 240 performs a quality check on the retrieved calibration attributes against captured calibration attributes. In some embodiments, the actual calibration attributes is captured during normal operation of the HMD 105. In other embodiments, the calibration module 240 generates instructions to guide the user through steps of a calibration process to capture calibration attributes. The calibration module 240 compares the captured, i.e., actual, calibration attributes to retrieved calibration attributes. For example, the expected calibration attributes indicates an expected set of coordinate points of a landmark representing the user's nose. The actual calibration attributes indicates an actual, i.e., experimentally captured, set of coordinate points of the landmark. If a difference between the retrieved calibration attributes and the actual calibration attributes is less than a threshold value, the retrieved calibration attributes provides sufficient quality for effective use of the HMD 105. In contrast, if a difference between the retrieved calibration attributes and the actual calibration attributes is greater than a threshold value, then the calibration module 240 determines that the expected calibration attributes is too different from the actual calibration attributes for effective use of the HMD 105. The calibration module 240 then uploads the actual calibration attributes and the user's selection parameters to the online server. In some embodiments, the calibration module 240 uploads the selection parameters and the actual calibration attributes to the online server regardless of whether or not the retrieved calibration attributes and the actual calibration attributes is greater than a threshold value. In this manner the online calibration server is able to augment a global calibration attributes set that is built from information from many (e.g., thousands of) different users. As the global calibration attributes set gets larger the accuracy of calibration attributes retrieved from it increases, thereby minimizing calibration time on individual HMDs 105.

As noted above, the calibration module 240 may capture actual calibration attributes via instructions that guide the user through steps of a calibration process. The calibration module 240 provides the instructions to the electronic display 115 (e.g., via the display interface module 270) for presentation to the user. In one example use case, the calibration module 240 instructs a user wearing the HMD 105 to perform one or more facial expressions such as blinking, squinting, raising an eyebrow, smiling, frowning, looking in a particular direction, or maintaining a neutral face (i.e., a resting face without any particular facial expressions to provide a baseline for comparison against faces with facial expressions). The facial data capture module 230 works in conjunction with the calibration module 240 to capture facial data corresponding to portions of the user's face as the user is performing the one or more facial expressions. Then, the calibration module 240 maps the captured facial data to corresponding facial expressions, e.g., the calibration module 240 maps a blinking facial expression to facial data captured after the user was instructed to blink. The calibration module 240 stores the captures facial data and the mappings in the facial tracking store 225 and/or any other database on or off of the system 100 that the facial tracking system 160 can access.

In another example use case, the calibration module 240 identifies landmarks of a face of a user based at least in part on the captured facial data and the mappings. Landmarks include locations of, e.g., an eyebrow of the user, an eyelid of the user, a pupil of the user, a nose of the user, a check of the user, a forehead of the user, and the like. In an embodiment, the facial data is represented by images captured by imaging type facial sensors 210 (e.g., cameras). The calibration module 240 identifies landmarks by determining that one or more features indicative of a landmark are shown in the captured images. For instance, a feature of a facial expression "raising an eyebrow" is that the user's eyebrow will move. Thus, the calibration module 240 identifies images and/or portions of images that correspond to a moving eyebrow based on the brightness and/or intensity levels of pixels of the images. In particular, brightness and/or intensity levels of one or more pixels of each image changes over a sequence of images in the plurality of captured images, e.g., because moving an eyebrow causes surfaces of a face of the user to move, causing a change in the brightness (or intensity) of light reflected off of the face. The calibration module 240 determines coordinate points of the one or more pixels and maps the coordinate points to a landmark associated with a location of the eyebrow of the user. For instance, in a two-dimensional image of the plurality of captured images, pixels are organized on a plane with an x-axis and a y-axis. Coordinate (x, y) points (8, 46), (8, 47), and (8, 48) are mapped to the eyebrow landmark. Then the calibration module 240 stores the mapping in the facial tracking store 225 and/or any other database on or off of the system 100 that the facial tracking system 160 can access. In one embodiment, if the calibration module 240 is unable to map captured images to a landmark, then the calibration module 240 generates instructions for the user to repeat a facial expression to recapture images corresponding to the facial expression. The calibration module 240 may perform facial calibrations passively (e.g., without alerting a user) or actively (e.g., prompting a user to go through a series of expressions as previously described). The calibration attributes is used in normal operation of the VR system 100.

The facial sensor processing module 250 processes the facial data captured by the facial data capture module 230. In embodiments with imaging type facial sensors 210, the captured facial data is based on light reflected off the user. Light emitted by a light source 200 reflects off of planar sections of a face and/or eye of a user, the reflected light is captured by a facial sensor 210. A planar section is a tiny portion of user's face which the facial tracking system 160 approximates as a plane. The captured light is brightest (e.g., highest intensity) when an angle of incidence on the surface equals the angle of the captured light. Thus, in a sample facial data frame including a plurality of pixels captured by a facial sensor 210, the brightest pixel of the plurality of pixels is based on a position and/or orientation of a light source 200 from which reflected light originated relative to the planar section that the light was reflected from. The brightest pixel is, e.g., the pixel that has the greatest intensity value where the intensity value represents the amount of light captured by the one or more facial sensors 210. The facial sensor processing module 250 determines the brightest pixel (or brightest pixels) in captured facial data frames using, e.g., image processing techniques known to one skilled in the art. In some embodiments, the facial sensor processing module 250 preprocesses the captured facial data frames using noise reduction methods to improve the quality (e.g., resolution of pixel brightness) of the facial data frames, and thus resulting in a more accurate determination of brightness of pixels. For instance, if the facial data frame is too bright or too dim, the facial sensor processing module 250 applies an image brightness offset correction and/or an image filter to the captured facial data frame.

In an embodiment, the facial sensor processing module 250 may be configured to analyze facial data comprising a plurality of facial data frames captured by the facial sensors 210. Based on the analysis, the facial sensor processing module 250 generates information representing tracked portions of a face of a user wearing the HMD 105. In embodiments with imaging type facial sensors 210, the facial sensor processing module 250 determines which facial data frame of the plurality of facial data frames includes the brightest pixel at a particular pixel location. For instance, each frame of the plurality of frames is a two-dimensional image with pixel locations indicated by coordinate (x, y) pairs and has a dimension of 50 pixels by 50 pixels. Each coordinate pair maps to a particular planar section on the tracked portions of the user's face. For each facial data frame of the plurality of facial data frames, the position and/or orientation of a light source 200 corresponding to the facial data frame is different. For example, each of the facial data frames may have been captured with a different light source 200 illuminating the tracked portions of the user's face. The facial sensor processing module 250 determines which facial data frame of the plurality of facial data frames includes the brightest pixel at location (0, 0), and repeats this process for each pixel location of each facial data frame, e.g., (0, 1), (0, 2), (0, 3), etc. Accordingly, the facial sensor processing module 250 is able to identify which of the one or more light sources 200 results in a brightest pixel for each coordinate pair, and hence for each corresponding planar section of the tracked portion of the user's face. In some embodiments, the facial sensor processing module 250 simply selects for each coordinate pair the source 200 which resulted in the brightest pixel value. In alternate embodiments, the facial processing module 250 generates an intensity curve for each coordinate pair using the pixels values from the captured facial data frames.

The facial sensor processing module 250 determines a normal vector to each planar section of the tracked portions of the user's surface. Accordingly, for each pixel there is a corresponding normal vector to a planar section imaged by that pixel. In some embodiments, for a given pixel imaging portions of the user's face, the facial sensor processing module 250 determines a normal vector using the identified light source 200 that resulted in the brightest pixel value. The orientation of the identified light source 200 is constant and known relative to the facial sensor 210. The facial sensor processing module 250 uses the orientation to estimate a normal vector to the planar section of the user's face. The facial sensor processing module 250 determines a normal vector to a corresponding planar section of the user's face for each pixel. In some embodiments, the facial sensor processing module 250 determines the normal vectors using intensity curves for each pixel.

A normal vector to a planar section of the user's face describes an orientation of part of the user's face. Tracked portions of a user's face may be described using a plurality of planar sections, one for each pixel. The facial sensor processing module 250 determines normal vectors corresponding to each of those planar sections. The normal vectors may then be used to generate a virtual surface that describes the tracked portions of the user's face. The virtual surface describes an orientation of an area of the illuminated portions of the face. For example, the virtual surface describes the curvature of the user's nose, eyelid, or cheek. In an embodiment, the facial sensor processing module 250 stores the information representing the tracked portions of the face, e.g., the virtual surface, in the facial tracking store 225 and/or any database accessible by the VR system 100. The facial sensor processing module 250 may also provide the information representing the tracked portions to the facial animation module 260 for further processing.

The eye tracking module 255 processes the facial data captured by the facial data capture module 230. In an embodiment, the facial data describes a specular reflection of light, i.e., light from the light sources 200, and reflection off the cornea of an eye of a user wearing the HMD 105. The specular reflection depends on the originating light source 200. In particular, a specular reflection corresponding to a first light source 200 in certain position and orientation in the HMD 105 is different than a specular reflection corresponding to a second light source 200 in a different position and/or orientation in the HMD 105. The specular reflections differ because reflected light is brightest at the angle of incidence. Since the facial data capture module 230 coordinates illuminating the face, and thus including the eyes, of the user with capturing facial data, the eye tracking module 255 can map specular reflections to a particular position of a light source 200 from which light corresponding to a specular reflection originated. Based on the mappings, the eye tracking module 255 determines eye tracking information (e.g., a position and/or orientation of the eye of the user), for example, whether an eye is looking in the straight, left, right, upward, or downward direction.

In another embodiment, the eye tracking module 255 determines eye tracking information by identifying the brightest pixel (or brightest pixels) in a plurality of captured facial data frames using similar steps as the facial sensor processing module 250. The eye tracking module 255 maps information from the captured images (e.g., (x, y) coordinate points of pixels of the images) and/or light sources 210 to orientations of an eye of the user, e.g., the eye looking up towards a forehead of the user, the eye looking downwards towards a cheek of the user, and the like.

By tracking the eyes of a user (e.g., a direction of the user's gaze), as well as facial expressions and surfaces, the VR system 100 can provide a more immersive experience to the user in a VR environment. In an embodiment, the eye tracking module 255 stores the eye tracking information in the facial tracking store 225 and/or any database accessible by the VR system 100. The eye tracking module 255 may also provide the eye tracking information to the facial animation module 260 for further processing.

The facial animation module 260 generates a facial animation of some or all of the face of a user of the HMD 105. In one embodiment, the facial animation module 260 retrieves facial data representing tracked portions of a face of the user and/or eye tracking information from the facial tracking store 225 and/or any other database with the same data. The facial animation module 260 also retrieves mappings of the calibration module 240 (e.g., landmark information) from the facial tracking store 225 and/or any other database with the same data. The facial animation module 260 generates the facial animation information by aggregating the retrieved facial data and the retrieved mappings. For instance, the facial animation module 260 determines a plurality of planar sections of the face corresponding to a location of a landmark of the face, e.g., the planar sections corresponding to the user's nose. The facial animation module 260 combines a plurality of planar sections each corresponding to a location of a landmark. For instance, the retrieved mappings include five mappings indicating one-to-one mappings between five landmarks of the face of the user, e.g., a left pupil, a right pupil, a left cheek, a right cheek, and a tip of a nose and five locations, e.g., (x, y) coordinate points and/or sets of coordinate points of a facial data frame. Accordingly, the resulting facial animation information describes a graphical representation of the user's face (e.g., the whole face and/or portions of the face), which includes planar sections corresponding to each of the five landmarks. In some embodiments, the facial animation module 260 combines a plurality of planar sections with the eye tracking information. Thus, the facial animation may also include a graphical representation of a position and/or orientation of the user's eyes. In some embodiments, the facial animation information can be used to create an avatar of the user, e.g., a 3D virtual avatar representing the user's face in real life or a 3D virtual avatar representing the user's whole body in real life. In some embodiments, the 3D virtual avatar does not resemble the likeness of the user (e.g., a generic avatar), and the facial animation information is used to generate a facial expression such as a blink or smile on the virtual avatar. In some embodiments, the facial animation module 260 receives the information representing the tracked portions of the face of the user directly from the facial sensor processing module 250 and the eye tracking information directly from the eye tracking module 255.

In some embodiments, the facial animation module 260 generates the facial animation information by aggregating virtual surfaces generated by the facial sensor processing module 250. For example, the facial animation module 260 combines virtual surfaces of the user's nose, the user's eyes, and the user's cheeks. The facial animation module 260 may use calibration attributes to aggregate the virtual surfaces. For instance, the coordinates of a landmark of the calibration attributes describe an expected position of the virtual surface of the user's nose relative to the virtual surface of the user's eyes.

In an embodiment, the facial animation module 260 generates subsections of the facial animation information describing a virtual portion of a face of a user not corresponding to a mapping by interpolating data between other planar sections of the face corresponding to a mapping determined by the facial sensor processing module 250. In some embodiments, the facial animation module 260 generates subsections of the facial animation information based on other information including information (e.g., from an external source outside of the VR system 100 previously stored in the facial tracking store 225) describing typical geometries and characteristics of a face of a user based on data from a population of users, e.g., the average length of a nose of a user for a certain demographic range. In an embodiment, the facial animation module 260 generates the subsections of the facial animation further based on the landmarks identified by the calibration module 240. For example, the facial animation module 260 retrieves, from the facial tracking store 225, a landmark indicating coordinate points of pixels in a 2D image corresponding to the location of a left nostril of the user. Then the facial animation module 260 generates subsections of the facial animation information corresponding to a right nostril of the user by reflecting the coordinate points corresponding to the location of the left nostril across a line corresponding to a location of a centerline of a nose of the user, e.g., because a user's left and right nostrils are typically symmetric about the centerline of the nose.

The display interface module 270 provides information from the facial tracking system 160 to the electronic display 115 for presentation to a user of the HMD 105. In one embodiment, the display interface module 270 provides the facial animation information generated by the facial animation module 260 to the electronic display 115.

Head Mounted Display

Figure 3:
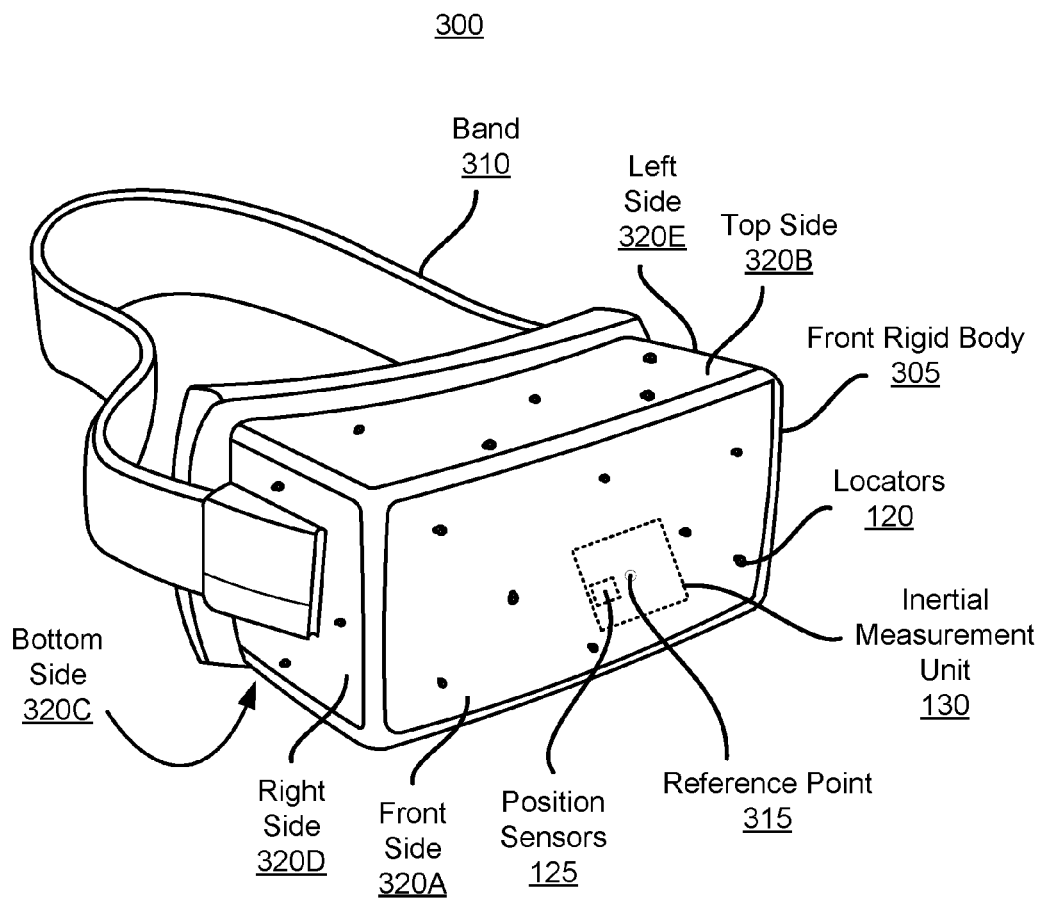
FIG. 3 is a wire diagram of a virtual reality HMD in accordance with an embodiment.

FIG. 3 is a wire diagram of a virtual reality HMD 300 in accordance with an embodiment. The HMD 300 is an embodiment of the HMD 105 and includes a front rigid body 305 and a band 310. The front rigid body 305 includes the electronic display 115 (not shown in FIG. 3), the IMU 130, the one or more position sensors 125, and the locators 120. In the embodiment shown by FIG. 3, the position sensors 125 are located within the IMU 130, and neither the IMU 130 nor the position sensors 125 are visible to the user.

The locators 120 are located in fixed positions on the front rigid body 305 relative to one another and relative to a reference point 315. In the example of FIG. 3, the reference point 315 is located at the center of the IMU 130. Each of the locators 120 emit light that is detectable by the imaging device 135. Locators 120, or portions of locators 120, are located on a front side 320A, a top side 320B, a bottom side 320C, a right side 320D, and a left side 320E of the front rigid body 305 in the example shown in FIG. 3.

Figure 4:
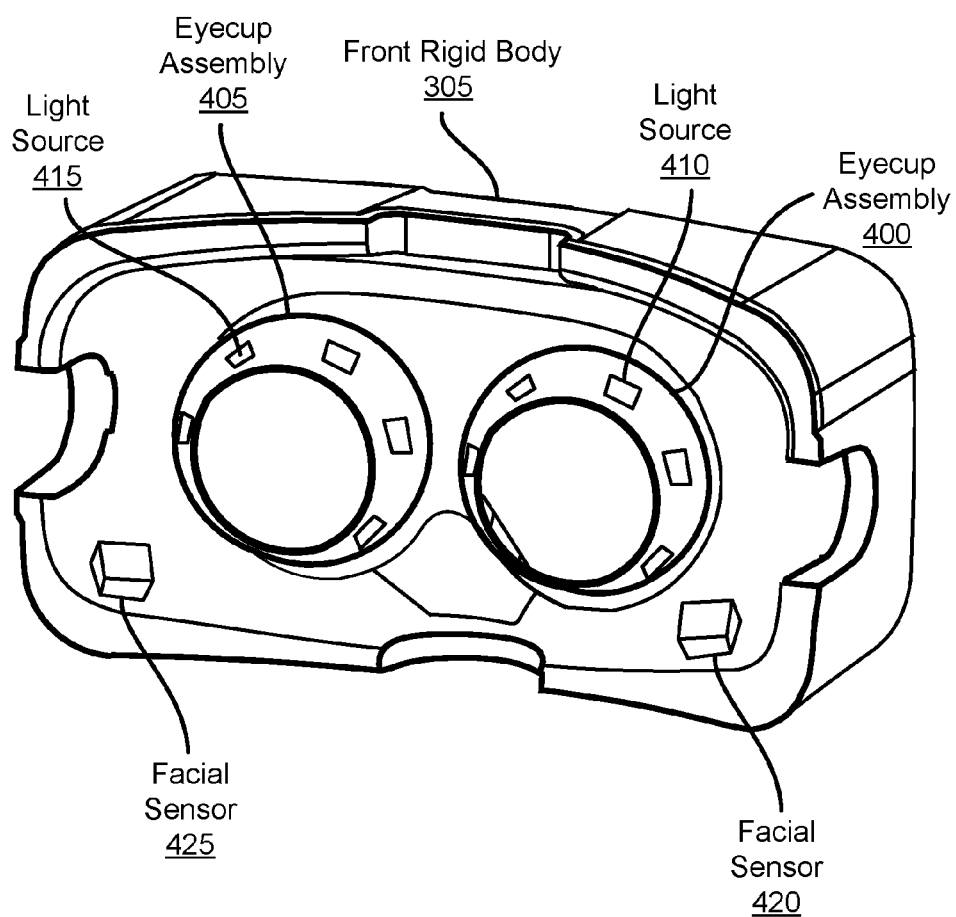
FIG. 4 is a wire diagram of an embodiment of a front rigid body of the virtual reality HMD shown in FIG. 3, in accordance with an embodiment.

FIG. 4 is a wire diagram of an embodiment of the front rigid body 305 of the virtual reality HMD 300 shown in FIG. 3, in accordance with an embodiment. In the embodiment shown in FIG. 4, the front rigid body 305 includes eyecup assembly 400, eyecup assembly 405, light sources 410 and 415, and facial sensors 420 and 425. The light sources 410, 415 are an embodiment of the light sources 200, and the facial sensors 420, 425 are an embodiment of the facial sensors 210. Eyecup assemblies 400 and 405 each comprise a plurality of light sources located outside the direct line of sight of a user wearing the HMD 300. In particular, eyecup assembly 400 comprises a plurality of light sources including at least light source 410, and eyecup assembly 405 comprises a plurality of light sources including at least light source 415. In FIG. 4, five light sources of each plurality of light sources are illustrated at distinct positions around each eyecup assembly. Eyecup assembly 400 is located on the right side of the front rigid body 305, and eyecup assembly 405 is located on the left side of the front rigid body 305 from the perspective of the user. Facial sensor 420 is located on the right side of the front rigid body 305, and facial sensor 425 is located on the left side of the front rigid body 305 from the perspective of the user. Further, facial sensors 420 and 425 are positioned out of the line of sight of the user. Similar to the light sources 410 and 415, the facial sensors 420 and 425 are located outside the direct line of sight of the user and orientated toward a face (and eyes) of the user.

Figure 5:
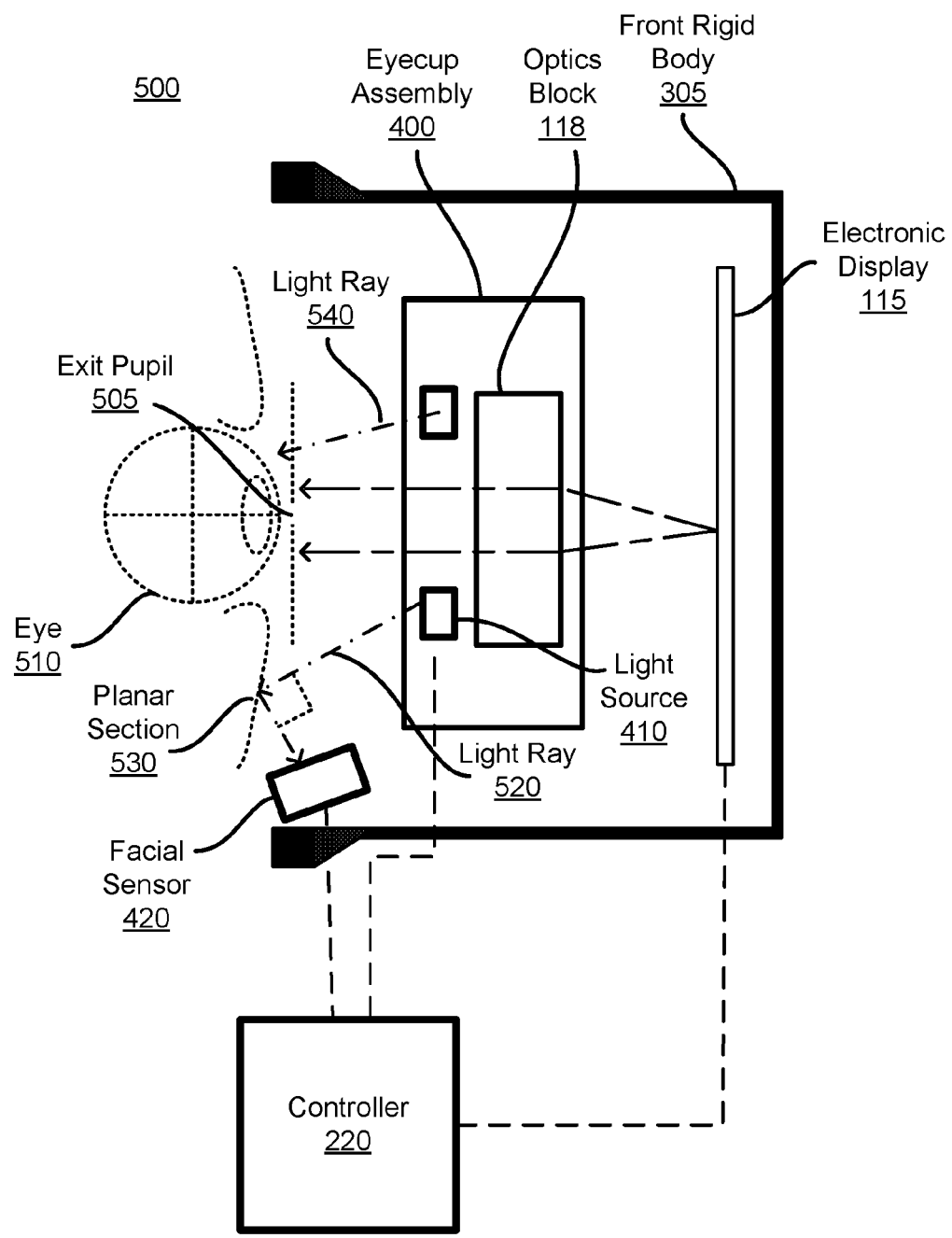
FIG. 5 is a cross section of the front rigid body of the virtual reality HMD in FIG. 4, in accordance with an embodiment.

FIG. 5 is a cross section 500 of the front rigid body 305 of the virtual reality HMD 300 in FIG. 4, in accordance with an embodiment. As shown in FIG. 5, the front rigid body 305 includes an electronic display element 115 that emits image light toward the optics block 118. The optics block 118 magnifies the image light, and in some embodiments, also corrects for one or more additional optical errors (e.g., distortion, astigmatism, etc.). Then, the optics block 118 directs the altered image light to the exit pupil 505 for presentation to the user. The exit pupil 505 is the location of the front rigid body 305 where an eye 510 of a user wearing the HMD 300 is positioned. For purposes of illustration, FIG. 5 shows a cross section 500 of a right side of the front rigid body 305 (from the perspective of the user) associated with a single eye 510, but another optical block, separate from the optical block 118, provides altered image light to another eye (i.e., a left eye) of the user.

The controller 220 is communicatively coupled to the electronic display 115 so that that the controller (e.g., via the display interface module 270) can provide media, e.g., image and/or video data such as the facial animation information generated by the facial animation module 260, for presentation to the user by the electronic display 115. Further, the controller 220 is also communicatively coupled to the light source 410 and facial sensor 420 such that the controller (e.g., via the facial data capture module 230) can provide instructions to the light source 410 and facial sensor 420 to illuminate and capture images of a portion of a face of the user.

In the example shown in FIG. 5, a light ray 520 emitted from the light source 410 reflects off a planar section 530 of the face of the user (e.g., a lower eyelid of the user). In this instance, the light ray's angle of incidence equals the light ray's angle of reflection (i.e., both angles equal 45 degrees so that the angle shown in FIG. 5 is 90 degrees). Among a plurality of facial data frames, any particular pixel of the facial data frames is the brightest based on the specific location of the originating light source 410 and the facial sensor 420. For example, a facial data frame, captured by facial sensor 420, of the planar section 530 illuminated by light ray 540 has a different brightest pixel than that of another facial data frame of the same planar section 530 illuminated by a different light ray 520. The location in the facial data frame (e.g., a (x, y) coordinate position for a 2D image of the facial data frame) of the brightest pixel in the facial data frame is different because the two light rays reflect off different planar sections of the user's face (or eye), and thus have different angles of incidence and reflectance.

Process Flow

Figure 6:
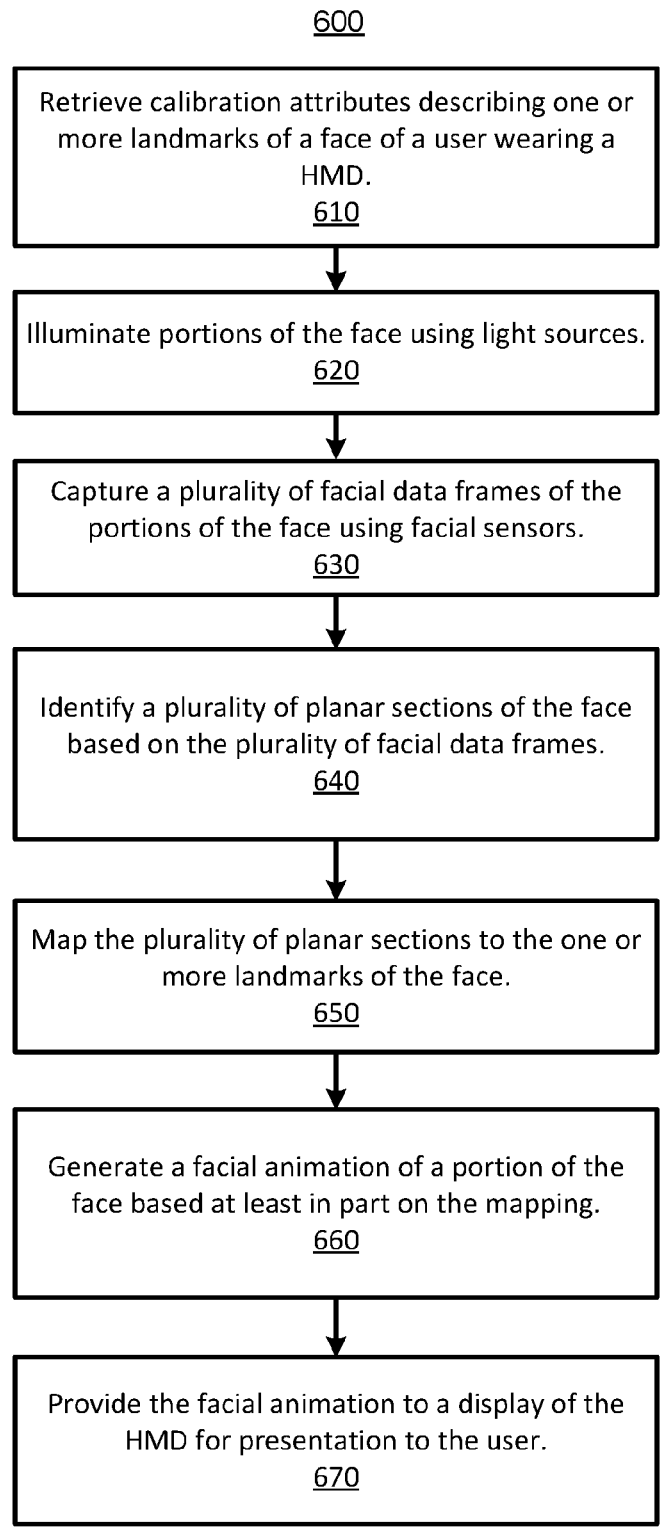
FIG. 6 is a flow chart illustrating a process of facial animation, in accordance with an embodiment.

FIG. 6 is a flow chart illustrating a process 600 of facial animation in accordance with an embodiment. In an embodiment, the process 600 is used within the VR system 100 in FIG. 1. The example process of FIG. 6 may be performed by the facial tracking system 160, the HMD 105, the console 110, and/or some other system (e.g., an AR or MR system). Other entities perform some or all of the steps of the process in other embodiments. Likewise, embodiments include different and/or additional steps, or perform the steps in different orders. Additionally, the process includes different and/or additional steps than those described in conjunction with FIG. 6 in some embodiments.

The facial tracking system 160 retrieves 610 calibration attributes describing one or more landmarks of a face of a user wearing a HMD 105, e.g., the location of an eyebrow or nose of the user. The facial tracking system 160 retrieves the calibration attributes using a local calibration procedure, from the facial tracking store 225 and/or from a using online calibration server including global calibration attributes.

The facial tracking system 160 illuminates 620 portions of the face using light sources 200. For instance, a portion of the face within the HMD 105 is an eye of the user, or the area around an eyebrow, nose, eye, and/or cheek of the user. In embodiments with non-imaging type facial sensors 210, the illuminating 620 is omitted.

The facial tracking system 160 (e.g., the facial data capture module 230) captures 630 a plurality of facial data frames of the portions of the face using facial sensors 210.

The facial tracking system 160 identifies 640 a plurality of planar sections of the face (or eye) based on the plurality of facial data frames. Each planar section of the face has a location on the face and orientation relative to the face. In embodiments with imaging type facial sensors 210, the facial data frames are images each including a plurality of pixels. The plurality of planar sections are identified based on an analysis of the brightest pixels in each facial data frame of the plurality of facial data frames.

The facial tracking system 160 maps 650 the plurality of planar sections to the one more landmarks of the face. For instance, a surface corresponding to a surface of a nose of the user is mapped to a landmark indicating the location of the nose of the user.

The facial tracking system 160 generates 660 facial animation information (e.g., in 2D or 3D) describing a portion of the face based at least in part on the mapping. The portion of the face is the portion captured by the facial data frames. In particular, the facial tracking system 160 combines mappings to construct an aggregate of planar sections of the face of the user. For instance, a mapping of a surface of the user's nose to a nose landmark is aggregated with mappings of surfaces of the user's eyes to eye landmarks, mappings of surfaces of the user's eyebrows to eyebrow landmarks, and so forth.

The facial tracking system 160 provides 670 the facial animation information to a display of the HMD (e.g., electronic display 115 of HMD 300) for presentation to the user. For instance, the facial animation information is used to generate a facial expression on a virtual avatar and/or a virtual avatar representing a face of the user in real life. The virtual avatar helps provide an immersive VR experience for the user of the VR system 100. In other embodiments, the facial tracking system 160 stores, in a database, the facial animation information for future use. Further, the facial tracking system 160 can provide the facial animation information for presentation to other users of the VR system 100.

Though the facial tracking system 160 is described using light sources and facial sensors to track a user's facial expressions and eye movements, it should be noted that the process 600 can be used to track a user's facial expressions and eye movements using other techniques that do not require light sources and/or facial sensors. For example, the other techniques use ultrasound sensors, proximity sensors, etc.

Additional Configuration Considerations

The foregoing descriptions of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head mounted display (HMD) comprising:
    a display element configured to display content to a user wearing the HMD;
    an optics block configured to direct light from the display element to an exit pupil of the HMD;
    a plurality of light sources positioned at discrete locations around the optics block, the plurality of light sources configured to illuminate portions of a face, inside the HMD, of the user;
    a facial sensor configured to capture one or more facial data of a portion of the face illuminated by one or more of the plurality of light sources; and
    a controller configured to:
        receive a plurality of captured facial data from the facial sensor;
        identify a plurality of surfaces of the portion of the face based at least in part on the plurality of captured facial data;
        retrieve a plurality of landmarks each indicating a position of a different feature of the face, the plurality of landmarks determined based on calibration attributes corresponding to a plurality of different facial expressions performed by the user for a calibration process;
        retrieve global calibration attributes, the global calibration attributes generated based on facial expressions performed by a population of users;
        responsive to determining that a difference between the calibration attributes and the global calibration attributes is less than a threshold value:
            map the plurality of surfaces to one of the plurality of landmarks; and
            generate facial animation information describing the portion of the face of the user based at least in part on the plurality of captured facial data and the mapping.

2. The HMD of claim 1, wherein the controller is further configured to:
    provide instructions to the user to perform the plurality of different facial expressions for the calibration process;
    generate the calibration attributes responsive to the user performing at least one of the plurality of different facial expressions; and
    identify the plurality of landmarks based at least in part on the calibration attributes.

3. The HMD of claim 1, wherein the display element is configured to display an avatar to the user, and the avatar's face is based on the facial animation information.

4. The HMD of claim 1, wherein the controller is further configured to:
   generate intensity curves for coordinates of frames of the plurality of captured facial data using pixel values of the plurality of captured facial data; and
   wherein identifying the plurality of surfaces of the portion of the face comprises determining normal vectors using the intensity curves.

5. The HMD of claim 1, wherein the plurality of captured facial data describe frames of an image, the image comprising a plurality of pixels, each pixel associated with a coordinate (x, y) location of the image, and wherein the controller is further configured to:
   identify, for each coordinate location of the image, a planar section corresponding to the brightest pixel value at the coordinate location;
   identify a light source position corresponding to each of the identified planar sections;
   generate a virtual surface of the portion of the face based at least in part on the identified planar sections and the identified light source positions; and
   wherein generating the facial animation information is further based on the virtual surface.

6. The HMD of claim 1, wherein the controller is further configured to:
   provide instructions to the plurality of light sources to illuminate the portions of the face; and
   provide instructions to the facial sensor, coordinated with the instructions to the plurality of light sources, to capture the one or more facial data.

7. The HMD of claim 6, wherein the plurality of light sources are positioned in a ring arrangement around the optics block, and wherein the instructions provided to the plurality of light sources are coordinated such that only one light source of the plurality of light sources illuminates the portions of the face at any given time.

8. The HMD of claim 1, wherein the controller is further configured to:
   receive specular reflection information from the plurality of facial data; and
   identify a position of an eye of the user based at least in part on the specular reflection information.

9. The HMD of claim 1, wherein the global calibration attributes are retrieved from an online calibration server, and wherein the controller is further configured to upload the calibration attributes to the online calibration server.

10. A head mounted display (HMD) comprising:
    a display element configured to display content to a user wearing the HMD;
    a plurality of light sources positioned at discrete locations outside a line of sight of the user, the plurality of light sources configured to illuminate portions of a face, inside the HMD, of the user;
    a facial sensor configured to capture one or more facial data of a portion of the face illuminated by one or more of the plurality of light sources; and
    a controller configured to:
       receive a plurality of captured facial data from the facial sensor;
       identify a plurality of surfaces of the portion of the face based at least in part on the plurality of captured facial data;
       retrieve a plurality of landmarks each indicating a position of a different feature of the face, the plurality of landmarks determined based on calibration attributes corresponding to a plurality of different facial expressions performed by the user for a calibration process;
       retrieve global calibration attributes, the global calibration attributes generated based on facial expressions performed by a population of users;
       responsive to determining that a difference between the calibration attributes and the global calibration attributes is less than a threshold value:
          map the plurality of surfaces to one of the plurality of landmarks; and
          generate facial animation information describing the portion of the face of the user based at least in part on the plurality of captured facial data and the mapping.

11. The HMD of claim 10, wherein the controller is further configured to:
    provide instructions to the user to perform the plurality of different facial expressions for the calibration process;
    generate the calibration attributes responsive to the user performing at least one of the plurality of different facial expressions; and
    identify the plurality of landmarks based at least in part on the calibration attributes.

12. The HMD of claim 10, wherein the display element is configured to display an avatar to the user, and the avatar's face is based on the facial animation information.

13. The HMD of claim 10, wherein the controller is further configured to:
    generate intensity curves for coordinates of frames of the plurality of captured facial data using pixel values of the plurality of captured facial data; and
    wherein identifying the plurality of surfaces of the portion of the face comprises determining normal vectors using the intensity curves.

14. The HMD of claim 10, wherein the plurality of captured facial data describe frames of an image, the image comprising a plurality of pixels, each pixel associated with a coordinate (x, y) location of the image, and wherein the controller is further configured to:
    identify, for each coordinate location of the image, a planar section corresponding to the brightest pixel value at the coordinate location;
    identify a light source position corresponding to each of the identified planar sections;
    generate a virtual surface of the portion of the face based at least in part on the identified planar sections and the identified light source positions; and
    wherein generating the facial animation information is further based on the virtual surface.

15. The HMD of claim 10, wherein the controller is further configured to:
    provide instructions to the plurality of light sources to illuminate the portions of the face; and
    provide instructions to the facial sensor, coordinated with the instructions to the plurality of light sources, to capture the one or more facial data.

16. The HMD of claim 15, wherein the plurality of light sources are positioned in a ring arrangement around the optics block, and wherein the instructions provided to the plurality of light sources are coordinated such that only one light source of the plurality of light sources illuminates the portion of the face at any given time.

17. The HMD of claim 10, wherein the controller is further configured to:
    receive specular reflection information from the plurality of facial data; and identify a position of an eye of the user based at least in part on the specular reflection information.

18. A head mounted display (HMD) comprising:
a display element configured to display content to a user wearing the HMD;
an optics block configured to direct light from the display element to an exit pupil of the HMD;
a plurality of light sources positioned at discrete locations around the optics block, the plurality of light sources configured to illuminate portions of a face, inside the HMD, of the user;
a facial sensor configured to capture one or more facial data of a portion of the face illuminated by one or more of the plurality of light sources; and
a controller configured to:
 receive a plurality of captured facial data from the facial sensor;
 identify a plurality of surfaces of the portion of the face based at least in part on the plurality of captured facial data;
 retrieve global calibration attributes, the global calibration attributes generated based on facial expressions performed by a population of users;
 responsive to determining that a difference between calibration attributes of the user and the global calibration attributes is less than a threshold value:
  provide the plurality of surfaces to a virtual reality (VR) console; and
  receive, from the VR console a virtual animation of the portion of the face of the user, the virtual animation generated by mapping the plurality of surfaces to one of a plurality of landmarks each indicating a position of a different feature of the face, the plurality of landmarks determined based on the calibration attributes of the user corresponding to a plurality of different facial expressions performed by the user for a calibration process.

19. The HMD of claim 18, wherein the controller is further configured to:
provide instructions to the user to perform the plurality of different facial expressions for the calibration process;
generate the calibration attributes responsive to the user performing at least one of the plurality of different facial expressions;
identify the plurality of landmarks based at least in part on the calibration attributes; and
provide the plurality of landmarks to the VR console.

20. The HMD of claim 18, wherein the facial sensor is selected from a group consisting of: a camera, audio sensor, strain gauge, electromagnetic sensor, and proximity sensor.

* * * * *

UNITED STATES PATENT AND TRADEMARK OFFICE
CERTIFICATE OF CORRECTION

PATENT NO. : 9,959,678 B2
APPLICATION NO. : 15/172473
DATED : May 1, 2018
INVENTOR(S) : Dov Katz et al.

Page 1 of 1

It is certified that error appears in the above-identified patent and that said Letters Patent is hereby corrected as shown below:

In the Claims

Column 19, Line 15, after "corresponding to" delete "the" and insert -- a --.
Column 20, Line 42, after "correspondence to" delete "the" and insert -- a --.

Signed and Sealed this
Twenty-fifth Day of September, 2018

Andrei Iancu
*Director of the United States Patent and Trademark Office*